Mar. 13, 1923.
J. C. BARRETT
WEIGHING SCALE
Filed Dec. 12, 1918
1,448,427
3 sheets-sheet 1
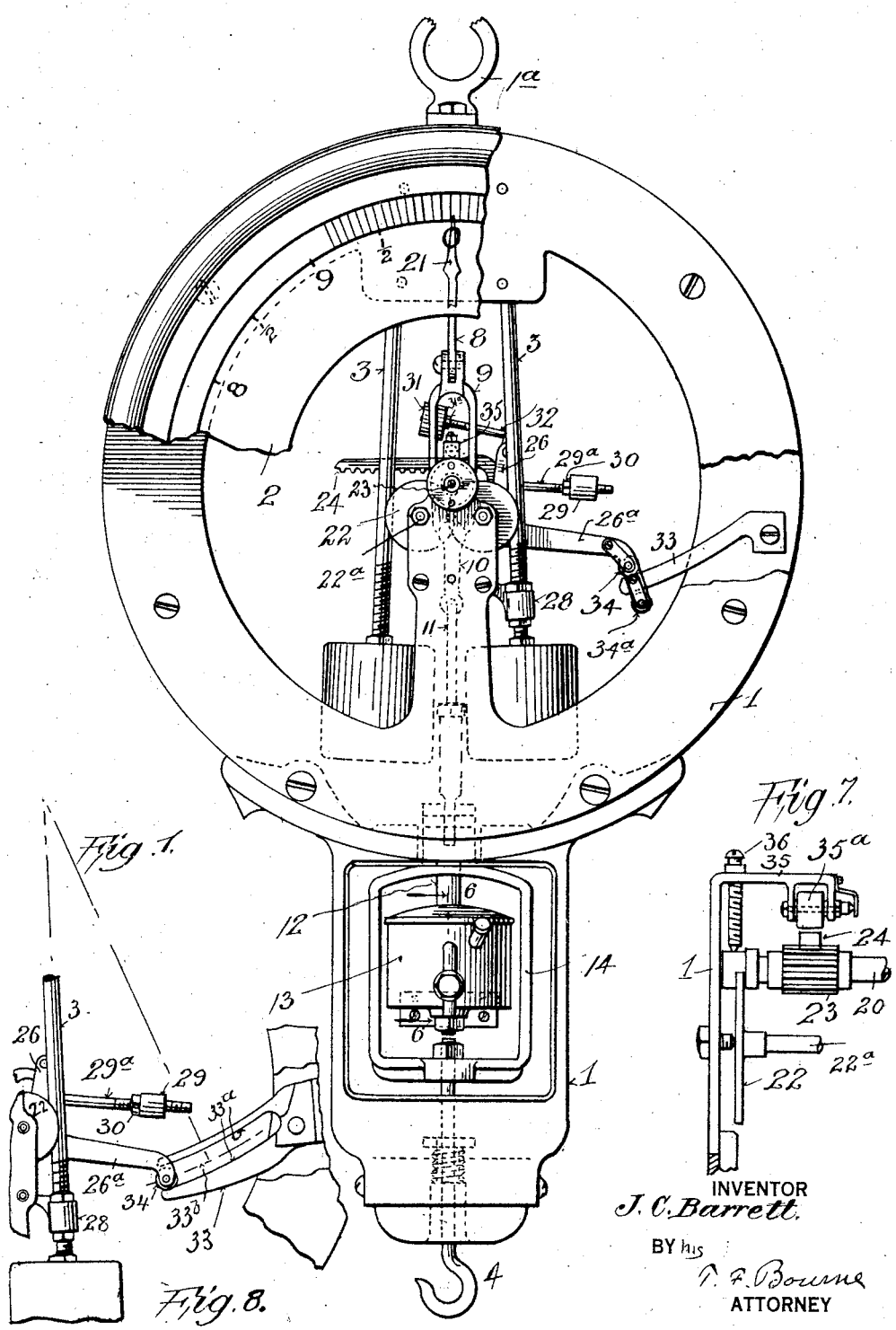

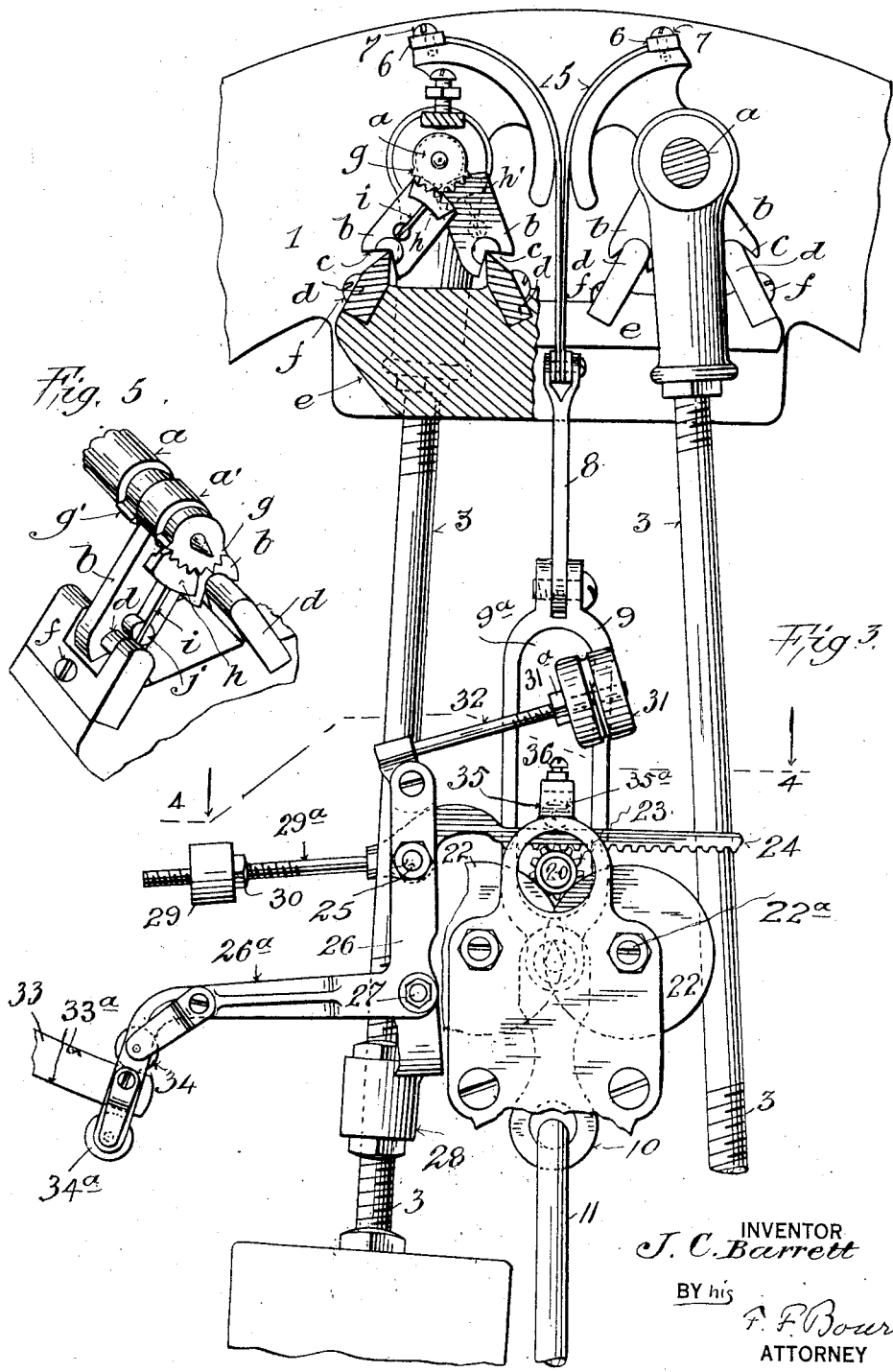

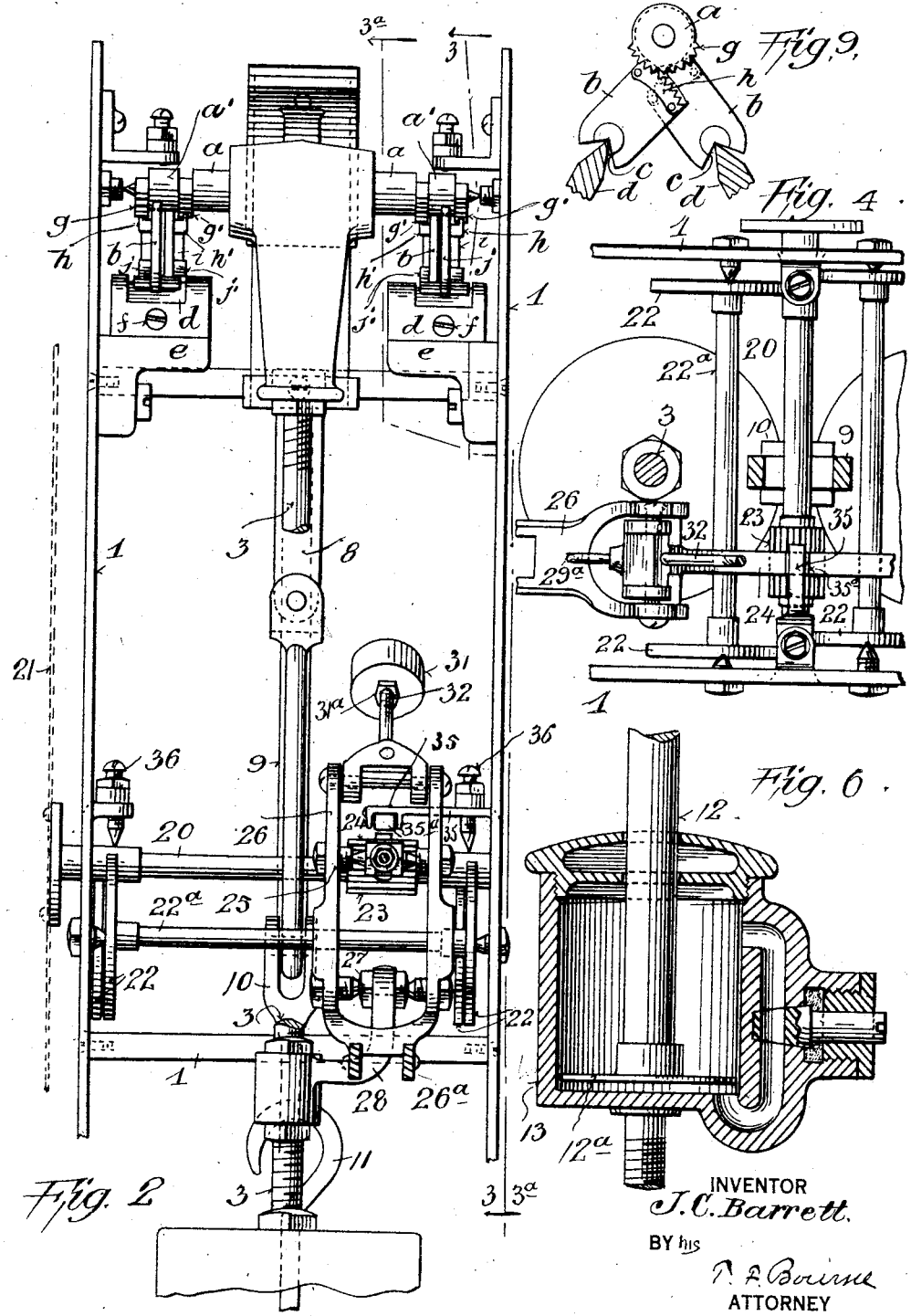

Patented Mar. 13, 1923.

1,448,427

UNITED STATES PATENT OFFICE.

JOSEPH C. BARRETT, OF BROOKLYN, NEW YORK, ASSIGNOR TO AMERICAN KRON SCALE CO., OF NEW YORK, N. Y., A CORPORATION OF NEW YORK.

WEIGHING SCALE.

Application filed December 12, 1918. Serial No. 266,424.

*To all whom it may concern:*

Be it known that I, JOSEPH C. BARRETT, a citizen of the United States, and resident of Brooklyn, in the county of Kings and State of New York, have invented certain new and useful Improvements in Weighing Scales, of which the following is a specification.

These improvements are particularly adapted for use in the class of weighing scales having one or more levers or arms operable by means of the articles being weighed to cause an indicator or pointer to indicate the weight of the article being weighed.

One of the objects of the invention is to provide improved means for causing operation of the indicator or pointer by reason of the actuation of the lever or arm of the class above referred to, whereby the operation of such indicator will be uniform throughout its range of movements.

Another object is to locate the indicator or pointer actuating devices below the pivots of said lever or arm and operable thereby, whereby a minimum of movement of such pivots on their supports will be required.

This invention comprises novel details of improvement and combinations of parts that will be more fully hereinafter set forth and then pointed out in the claims.

Reference is had to the accompanying drawings in which—

Figure 1 is a partially broken front view of a weighing scale mechanism embodying this invention;

Fig. 2 is an enlarged side view of Fig. 1, parts being removed;

Fig. 3 is a vertical section on the line 3, 3 and partially along the line $3^a$, $3^a$, in Fig. 2;

Fig. 4 is a horizontal section substantially on the line 4, 4 in Fig. 3;

Fig. 5 is a detail perspective view of supporting means for the weighted lever or arm;

Fig. 6 is an enlarged section substantially on the line 6—6 in Fig. 1;

Fig. 7 is an enlarged detail of part of the indicator or pointer operating means;

Fig. 8 is a detail view illustrating a modification; and Fig. 9 is a detail of another modification.

Similar numerals of reference indicate corresponding parts in the several views.

A casing suitable to support the mechanism hereinafter described is indicated at 1, which casing may be supported as upon the standard of a scale platform, or may be hung from a support in any suitable manner, as by an eye $1^a$. At 2 is a suitable dial which may be carried by casing 1 in any well known manner. At 3 are weighted levers or arms adapted for connection with draft mechanism in any suitable manner, such as with a draft hook 4. One or more of such levers 3 may be utilized in a scale. As illustrated in the accompanying drawings two levers 3 are provided with supporting parts that are similar. So far as the devices hereinafter described for operating the indicator are concerned, the levers 3 may be supported for rocking in any suitable manner. As a preferred form the levers are shown provided with pivots or gudgeons $a$ projecting on opposite sides thereof, the pivots being supported by corresponding pairs of rocking members $b$ shown provided with V-like recesses $c$ at the lower ends resting upon knife edges $d$. The knife edges $d$ are shown supported upon blocks $e$ carried by casing or frame 1, which blocks are shown provided with recesses within which said knife edges are held by screws $f$. The upper surfaces of the members $b$ are suitably curved to support the pivots $a$ rocking thereon. The above described parts are substantially similar to means for supporting levers set forth in my application for Letters Patent filed Feb. 21, 1917, No. 149,995. The pivots $a$ are shown respectively provided with bearing surfaces $a'$ which rest upon the upper curved edges of the supporting members $b$, and on opposite sides of the surfaces $a'$ the pivots are shown provided with teeth $g$, $g'$, respectively in mesh with racks or teeth $h$, $h'$, carried along the outer sides of corresponding members $b$. Said racks are shown supported by springs $i$, the upper ends of which are secured to the racks and the lower ends of which are attached to studs $j$ secured to the corresponding member $b$. By the arrangement described the members $b$ are delicately yet positively supported to rock upon the knife edges with minimum of friction caused by the rotation of the pivots or gudgeons thereon under varying positions to which the lever 3 may be tilted by reason of the load upon the platform or scale pan through the draft mechanism connected with the lever, and accumulation of dust is obviated between the knife edges and said members, as in my application aforesaid. The racks h, h', provide means to retain the members a in operative relation to the pivots b under all conditions of operation and at zero. While said teeth g, g', and racks h, h' intermesh they do not influence the rotation of the pivots as they rotate upon the members b to cause the latter to rock on their supports, yet the racks being resiliently supported upon the members b prevent such members from having undesirable displacement with respect to their normal position with respect to the pivots a. The aforesaid teeth and racks are generally similar to corresponding parts set forth in my said application for Letters Patent filed Feb. 21, 1917, Serial No. 149,995. Instead of the racks or teeth h, h' being resiliently supported on the members b the rack may be rigidly connected with the corresponding member, as by screws, illustrated in Fig. 9, and as more particularly set forth in my application for Letters Patent filed Dec. 29, 1916, Serial No. 139,480.

In accordance with my present improvements, by having the members b in pairs located adjacent to each other and side by side, co-operating upon the corresponding annular surface a' of the corresponding pivot a with the teeth g, g' on opposite sides of said surface and the racks h, h' located along the outer sides of said members b and intermeshing with said teeth the advantage of superior sensitiveness of operation of the scale is attained.

The levers 3 are connected with the draft mechanism by flexible connections 5, which may be secured by blocks 6 and screws 7 to the upper portions of said levers, said connections being shown depending and connected with a link 8, which link is shown pivotally connected with the draft member 9. The member 9 is shown pivotally connected with the depending link 10 that is engaged by the hook 11 to which is connected the piston rod 12 having a piston 12$^a$ within the dash pot chamber 13 that is supported by frame 1 within a yoke 14 secured to rod 12 and from which hook 4 depends. Fluid within said chamber will resist sudden action of the piston and weighing mechanism. The above described draft apparatus connected with levers 3 may be substituted by any other well known draft means adapted to pull the connections 5 for operating the said levers.

At 20 is a shaft journalled in the frame 1 and provided with an indicator or pointer 21 adapted to sweep over the dial 2 to indicate the weight of the article being weighed. Said shaft is shown supported upon rollers or discs 22 shown arranged in pairs and carried by shafts 22$^a$ journalled in the frame 1, whereby said shaft 20 is delicately supported for rotation in a well known manner. Shaft 20 is shown extending through a space or opening 9$^a$ in draft member 9, whereby interference with said shaft by the depending draft devices is prevented. The shaft 20 is shown provided with a pinion or gear 23 in mesh with a reciprocative rack 24 that is connected with a lever 3 by a movable member 26, rack 24 being shown pivoted at 25 to member 26, carried by the latter. Said member is shown in the form of an angular or bell-crank lever that is pivotally supported at 27 upon one of the levers 3 and to which the rack 24 is pivotally connected at 25. The said lever 3 is shown provided with a bracket or arm 28 that pivotally supports the member or lever 26 by means of sharpened screws forming pivots 27, whereby the member 26 may move with respect to lever 3. The rack 24 is shown provided with a counterpoise 29 which may be adjustably supported upon a threaded rod 29$^a$ secured to and extending from the rack 24. The counterpoise 29 is shown extending below pivot 25 at an angle to the plane of rack 24, whereby the rack may be delicately poised to reduce friction between the rack and pinion 23 by keeping the pitch lines of the meshing teeth in proper relation. A lock nut 30 on said rod 29$^a$ serves to co-operate with counterpoise 29 to retain the latter in set position. Member 26 is shown provided with a counterpoise 31 mounted adjustably upon a threaded rod 32 secured to and extending angularly from the upper arm of said member. A nut 31$^a$ on rod 32 secures the counterpoise in set position. The lower arm 26$^a$ of member 26 is shown co-operative with a control member 33 that is secured to and projects from the frame 1. As shown in Fig. 3 the control member 33 has outer edges 33$^a$ curved to correspond with arcs described around the axis of lever 3, and for ease of operation and to reduce friction, the arm 26$^a$ is shown provided with pivoted rollers 34, 34$^a$ opposing the edges 33$^a$ respectively and spaced apart wider than the width of member 33, so that only one of said rollers will co-operate with an edge 33$^a$ at the same time. As shown in Fig. 8 member 33 is shown provided with a slot 33$^b$ receiving anti-friction roller 34 journalled at the outer end of arm 26$^a$ of member 26. Said slot 33$^b$ has edges 33$^a$ spaced wider than roller 34 so that said roller will only touch one edge at a time. Said edges coincide with arcs described around the axis of lever 3. When the lever 3 carrying the member or lever 26 is swung laterally from the normal position shown in Figs. 1 and 3, by reason of weight applied to the draft mechanism, the rack 24 will be moved laterally, whereby said rack will cause the rotation of the pinion 23 to operate the indicator or pointer 21 with respect to the dial 2. The co-operation of the member 26 with the control member 33 will cause proper operation of rack 24 upon pinion 23 in all positions of lever 3. The member or lever 26, through its friction roller, will be maintained in proper co-operative relation to one of the edges 33ª of the member 33 by means of counterpoise 31, and the shape of said edge is such, with respect to the movements of the lever 3, member 26 and rack 24, as to cause said rack properly to rotate the indicator or pointer during the different movements of the said lever and rack. A feature of particular advantage in regard to these improvements is the ability to permit the shaping of the desired controlling edge 33ª with respect to the movements of lever 3, member 26 and rack 24 for different positions of the latter to cause the indicator or pointer always to come to rest in proper position relative to the corresponding graduations on scale 2. For instance, when the scale is being sealed and in case the indicator or pointer does not rest accurately for a given weight in front of the appropriate graduation on scale 2, the part of controlling edge 33ª opposing the co-operative portion of lever 26 (such as the roller 34), may be filed or shaped to cause member 26 to tilt respecting said edge sufficiently to cause adjustment of rack 24, and thereby movement of pinion 23 may be effected to cause said indicator accurately to point at such graduation, and so on for as many graduations as may be required. Thereafter, as member 26 operates with respect to said controlling edge, the indicator will be caused to indicate accurately the weight of articles being weighed. Either of the edges 33ª may be selected as the controlling edge.

At 35ª is a stop shown in the form of a roller pivoted upon an arm 35 carried by frame 1 (Fig. 7) slightly above rack 24 to permit free reciprocation of said rack with respect to pinion 23 and in position to prevent said rack from rising out of mesh with said pinion, such as when the scale is jarred or transported and to reduce friction on rack 24 when in contact with the stop roller when in use. Stops, such as screws 36, held by frame 1 above shaft 20 prevent said shaft from rising from its supporting discs 32.

The supporting means for the levers 3 being above shaft 20 of the indicator or pointer 21, enables relatively long levers 3 to be utilized and the indicator operating means to have the required extent of movement while relatively small rotational movement of the pivots of said levers occurs, whereby reduction of friction between said pivots and their supporting members is effected, increasing the sensitiveness of the mechanism.

Having thus described my invention, what I claim and desire to secure by Letters Patent is:

1. A measuring instrument comprising an indicator, a lever, a movable member pivotally carried by the lever, means co-operative between said member and indicator for operating the latter upon movement of said lever and member, and means independent of the lever to control said member when moved by the lever, said member being movable with the lever relatively to the last named means to cause the indicator to come to rest in predetermined positions for corresponding positions of the lever and member.

2. A measuring instrument comprising an indicator, a lever, a pinion to operate the indicator, a rack co-operative with the pinion, a movable member pivotally carried by the lever and connected with said rack for operating the latter, and means independent of the lever to control said member when moved by the lever, said member being movable with the lever relatively to the last named means to cause the indicator to come to rest in predetermined positions for corresponding positions of the lever and member.

3. A measuring instrument comprising an indicator, a lever, a movable member pivotally carried by the lever, means co-operative between said member and indicator for operating the latter upon movement of said lever and member, and a control member supported separately from and co-operative with said first named member.

4. A measuring instrument comprising an indicator, a lever, a pinion to operate the indicator, a rack co-operative with the pinion, a movable member carried by the lever and connected with said rack for operating the latter, and a control member supported separately from and co-operative with said first named member.

5. A measuring instrument comprising an indicator, a lever, a member movably carried by said lever, counterbalancing means for said member, means co-operative between said member and indicator for actuating the latter upon movement of said lever and member, and means supported separately from and co-operative with said member to control its movement with said lever to cause predetermined operation of the indicator for corresponding positions of the lever and member.

6. A weighing scale comprising an indicator, a lever, a member pivotally carried by said lever and having upwardly extending and laterally extending arms, means co-operative between said upwardly extending arm and said indicator for actuating the latter, and means co-operative with the lateral arm of said lever for controlling its movement with said lever.

7. A weighing scale comprising an indicator, a lever, a member pivotally carried by said lever and having upwardly extending and laterally extending arms, a rack pivotally connected with the upwardly extending arm of said member, a pinion connected with the indicator and cooperative with said rack, and means co-operative with the lateral arm of said member for controlling its movement with said lever.

8. A weighing scale comprising an indicator, a lever, a member pivotally carried by said lever and having upwardly extending and laterally extending arms, means co-operative between said upwardly extending arm and said indicator for actuating the latter, and a control-member co-operative with the lateral arm of said first named member to control its movement with said lever.

9. A weighing scale comprising an indicator, a lever, a member pivotally carried by said lever and having upwardly extending and laterally extending arms, a rack pivotally connected with the upwardly extending arms of said member, a pinion connected with the indicator and co-operative with said rack, and a control member co-operative with the lateral arm of said first named member to control its movement with said lever.

10. A measuring instrument comprising an indicator having a shaft, a pinion to operate said shaft, a rack co-operative with said pinion, a lever, a member pivotally carried by said lever and having an upwardly extending arm pivotally connected with said rack, said member having a laterally extending arm, a control member co-operative with said lateral arm, counterbalancing means for said member, and load responsive means to operate said lever to indicate the weight of the articles being weighed.

11. In a measuring instrument, the combination of a depending lever, means pivotally supporting said lever, an indicator having a shaft supported below the pivotal support for said lever, a member movably carried by the lever below its pivotal support, means co-operative between said member and shaft for actuating the latter by the former, and means independent of the lever to control said member when moved by the lever, said member being movable with the lever relatively to the last named means to cause the indicator to come to rest in predetermined positions for corresponding positions of the lever and member.

12. In a measuring instrument, the combination of a depending lever, means pivotally supporting said lever, an indicator having a shaft supported below the pivotal support for said lever, a pinion to operate said shaft, a rack below said pivotal support co-operative with said pinion, and a movable member on said lever connected with the rack below the pivotal support for said lever for operating the rack and pinion therewith.

13. In a measuring instrument, the combination of a depending lever, means pivotally supporting said lever, an indicator having a shaft supported below the pivotal support for said lever, a pinion to operate said shaft, a rack below said pivotal support co-operative with said pinion, a member movably carried by said lever below its pivotal support and pivotally connected with said rack, and a control member co-operative with the first named member to control its movement during operation with the lever.

Signed at New York in the county of New York and State of New York this 11th day of December A. D. 1918.

JOSEPH C. BARRETT.